(12) United States Patent
Wright

(10) Patent No.: US 8,215,655 B1
(45) Date of Patent: Jul. 10, 2012

(54) SAFETY BAR DEVICE FOR WATER CRAFTS AND OTHER VEHICLES

(76) Inventor: Randall R. Wright, Willoughby, OH (US)

( * ) Notice: Subject to any disclaimer, the term of this patent is extended or adjusted under 35 U.S.C. 154(b) by 221 days.

(21) Appl. No.: 12/766,474

(22) Filed: Apr. 23, 2010

Related U.S. Application Data

(63) Continuation-in-part of application No. 12/543,444, filed on Aug. 18, 2009, now Pat. No. 7,934,741.

(51) Int. Cl.
*B62J 27/00* (2006.01)
(52) U.S. Cl. .................. 280/304.4; 280/288.4; 180/219
(58) Field of Classification Search .................. 16/405, 16/421, 426, 429; 114/363; 280/288.4, 293, 280/301, 302, 304.3, 304.4; 180/218, 219, 180/220
See application file for complete search history.

(56) References Cited

U.S. PATENT DOCUMENTS

| | | | |
|---|---|---|---|
| 3,822,917 A * | 7/1974 | George | 297/215.12 |
| 3,901,534 A * | 8/1975 | Popken | 280/304.4 |
| 4,030,750 A | 6/1977 | Abram | |
| 5,002,149 A | 3/1991 | Watanabe et al. | |
| 5,667,232 A | 9/1997 | Gogan et al. | |
| 6,568,699 B2 | 5/2003 | McCann | |
| 6,868,584 B2 | 3/2005 | Trottier | |
| 6,896,279 B2 | 5/2005 | Galvagno | |
| 6,966,471 B1 | 11/2005 | Wilson et al. | |
| D521,418 S | 5/2006 | Lee | |
| 2003/0006082 A1 | 1/2003 | Popoff | |

OTHER PUBLICATIONS www.denniskirk.com; PowerMadd Rider Hold-Tight; Internet posting; As of Aug. 18, 2009.

* cited by examiner

*Primary Examiner* — Tony Winner

(57) ABSTRACT

A retractable safety bar device for a rear passenger of a vehicle such as a water vehicle, snow vehicle, or motorcycle featuring two mounting brackets for attaching to sides of the vehicle; an inner bar pivotally attached to each mounting bracket; a generally U-shaped gripping component comprising two side bars and a horizontal bar, the side bars are adapted for telescopically receiving the inner bars; the device is adjustable in height by moving the gripping component upwardly and downwardly with respect to the inner bars, the device can pivot forwardly and backwardly between various pivot positions with respect to the mounting brackets; and locking mechanisms for securing the gripping component at a certain height with respect to the first inner bar and second inner bar and for securing the safety bar device in a particular pivot position.

7 Claims, 6 Drawing Sheets

SAFETY BAR DEVICE FOR WATER CRAFTS AND OTHER VEHICLES

CROSS REFERENCE

This application is a continuation in part of application Ser. No. 12/543,444, filed Aug. 18, 2009, now U.S. Pat. No. 7,934,741, dated May 3, 2011. The specification of which is incorporated herein by reference in its entirety.

FIELD OF THE INVENTION

The present invention is directed to a safety bar on a vehicle such as but not limited to a water vehicle (e.g., wave runner), a snow vehicle (e.g., snowmobile), and/or a motorcycle. More particularly, the present invention is directed to a retractable safety bar for stabilizing one or more rear passengers on such vehicles.

BACKGROUND OF THE INVENTION

Typically, a rear passenger on a vehicle such as a wave runner, snowmobile, or a motorcycle must rely on gripping the driver (e.g., his/her jacket, his/her abdomen, etc.) or another passenger directly in front of him/her for stabilization. Gripping on the driver (or forward passenger) can be both uncomfortable for the rear passenger and dangerous. For example, gripping onto the driver (or forward passenger) may not provide a sufficient grip for the passenger, and if a sudden acceleration or turn is made, the passenger is at risk of falling off of the vehicle (e.g., waver runner, snowmobile, motorcycle, etc.). The present invention features a safety bar device for a rear passenger of such vehicles. The device of the present invention may help provide comfort and peace of mind to the rear passenger.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a retractable safety bar device for a rear passenger of a vehicle such as a water craft or snow vehicle. In some embodiments, the device comprises a first mounting bracket adapted to be attached to a first side of the craft/vehicle via an attachment means, and a second mounting bracket adapted to be attached to a second side of the vehicle via an attachment means; a first inner bar pivotally attached to the first mounting bracket; a second inner bar pivotally attached to the second mounting bracket; a generally U-shaped gripping component comprising a first side bar, a second side bar opposite the first side bar, and a horizontal bar connecting the first side bar and second side bar, wherein the first side bar is adapted for telescopically receiving the first inner bar and the second side bar is adapted for telescopically receiving the second inner bar, wherein the safety bar device is adjustable in height by moving the gripping component upwardly and downwardly with respect to the first inner bar and the second inner bar; and a first locking mechanism for securing the gripping component at a certain height with respect to the first inner bar and second inner bar.

The safety bar device can pivot forwardly and backwardly between one of the multiple positions with respect to the first mounting bracket and second mounting bracket. In some embodiments, there is a second locking mechanism for securing the safety bar device in one of the multiple positions. As an example only, (the present invention is not limited in any way to this example) FIGS. 1 and 3 show that the safety bar device can pivot forwardly and backwardly between a first position, a second position, and a third position with respect to the first mounting bracket and second mounting bracket where a second locking mechanism for securing the safety bar device in the first position, second position, or third position. In some embodiments, and as an example only, to increase the number of possible forward and backward positions, additional apertures 460 may be disposed in the first mounting bracket 310 for the pin component 430 of the spring-loaded pull know 410 to insert into and lock the safety bar at a certain position/angle. As an example only. FIG. 1 currently shows three apertures 460 for the pin component 430 of the spring-loaded pull know 410 to insert into and lock the safety bar at three positions/angles.

In some embodiments, the first locking mechanism is a spring-loaded push button mechanism. In some embodiments, a spring-loaded push button is disposed in the first inner bar at or near a first end. In some embodiments, a spring-loaded push button is disposed in the first side bar of the gripping component. In some embodiments, the second locking mechanism is a spring-loaded pull knob mechanism. In some embodiments, a spring-loaded pull knob is disposed in the first inner bar at or near second end. In some embodiments, the first mounting bracket comprises apertures adapted to accommodate the spring-loaded pull knob. In some embodiments, the device can accommodate the passenger's legs. In some embodiments, the attachment means includes a screw/bolt mechanism.

DESCRIPTION OF PREFERRED EMBODIMENTS

Referring now to FIGS. 1-6, the present invention features a retractable safety bar device 100 for a rear passenger of a vehicle including but not limited to a water vehicle (e.g., wave runner), a snow vehicle (e.g., a snowmobile), and/or a motorcycle. Without wishing to limit the present invention to any theory or mechanism, it is believed that the safety bar device 100 of the present invention is advantageous because it can provide safety and comfort to a rear passenger by helping reduce the risk of falling off the vehicle when a sudden acceleration or steering adjustment is made.

Figure 1:
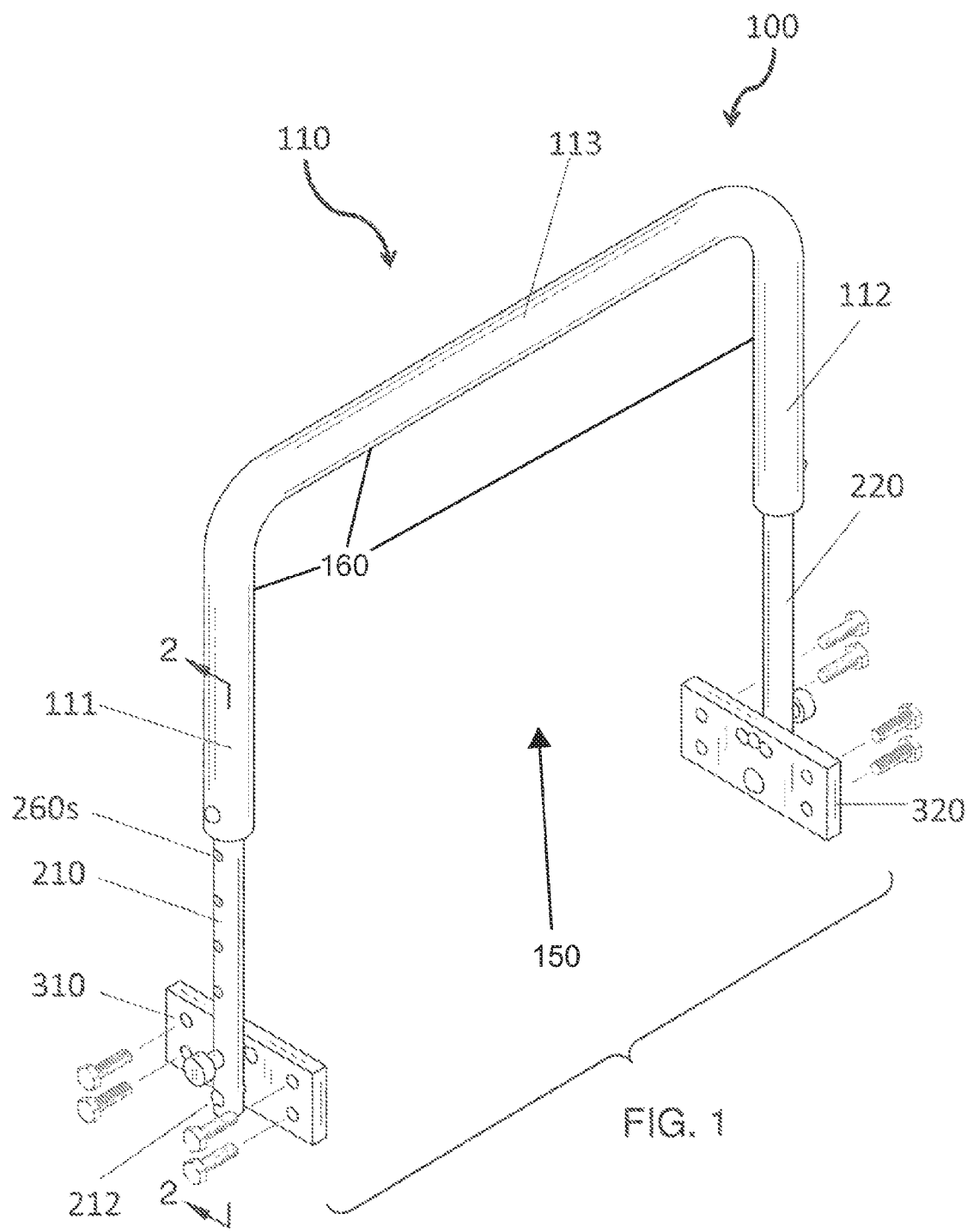
FIG. 1 is a perspective view of the safety bar device of the present invention.

As shown in FIG. 1, the safety bar device 100 of the present invention comprises a gripping component 110. The gripping component 110 is a bar that is secured to the vehicle 102 (e.g., the sides of the vehicle 102), the vehicle 102 including but not limited to a water vehicle (e.g., wave runner), a snow vehicle (e.g., a snowmobile), and/or a motorcycle. In some embodiments, the gripping component 110 is generally U-shaped. In some embodiments, the gripping component 110 is generally V-shaped, arc-shaped, the like, or a combination thereof. The gripping component 110 may be irregular in shape.

The gripping component 110 comprises a first side bar 111, a second side bar 112, and a horizontal bar 113 connecting the first side bar 111 with the second side bar 112 resulting in a general U-shape having a frill opening 150 around an inner periphery 160 of the gripping component 110. The first side bar 111 may be generally hollow and adapted for telescopically receiving a first inner bar 210. The second side bar 112 may be generally hollow and adapted for receiving a second inner bar 220.

The first inner bar 210 has a first end and a second end 212, wherein the first end is for inserting into the first side bar 111 of the gripping component 110. The second end 212 of the first inner bar 210 is for attaching to the motorcycle. In some embodiments, the second end of the first inner bar 210 is attached to the motorcycle 102 via a first mounting bracket 310.

The second inner bar 220 has a first end and a second end 222, wherein the first end is for inserting into the second side bar 112 of the gripping component 110. The second end 222 of the second inner bar 220 is for attaching to the motorcycle. In some embodiments, the second end of the second inner bar 220 is attached to the motorcycle via a second mounting bracket 320.

Figure 4:
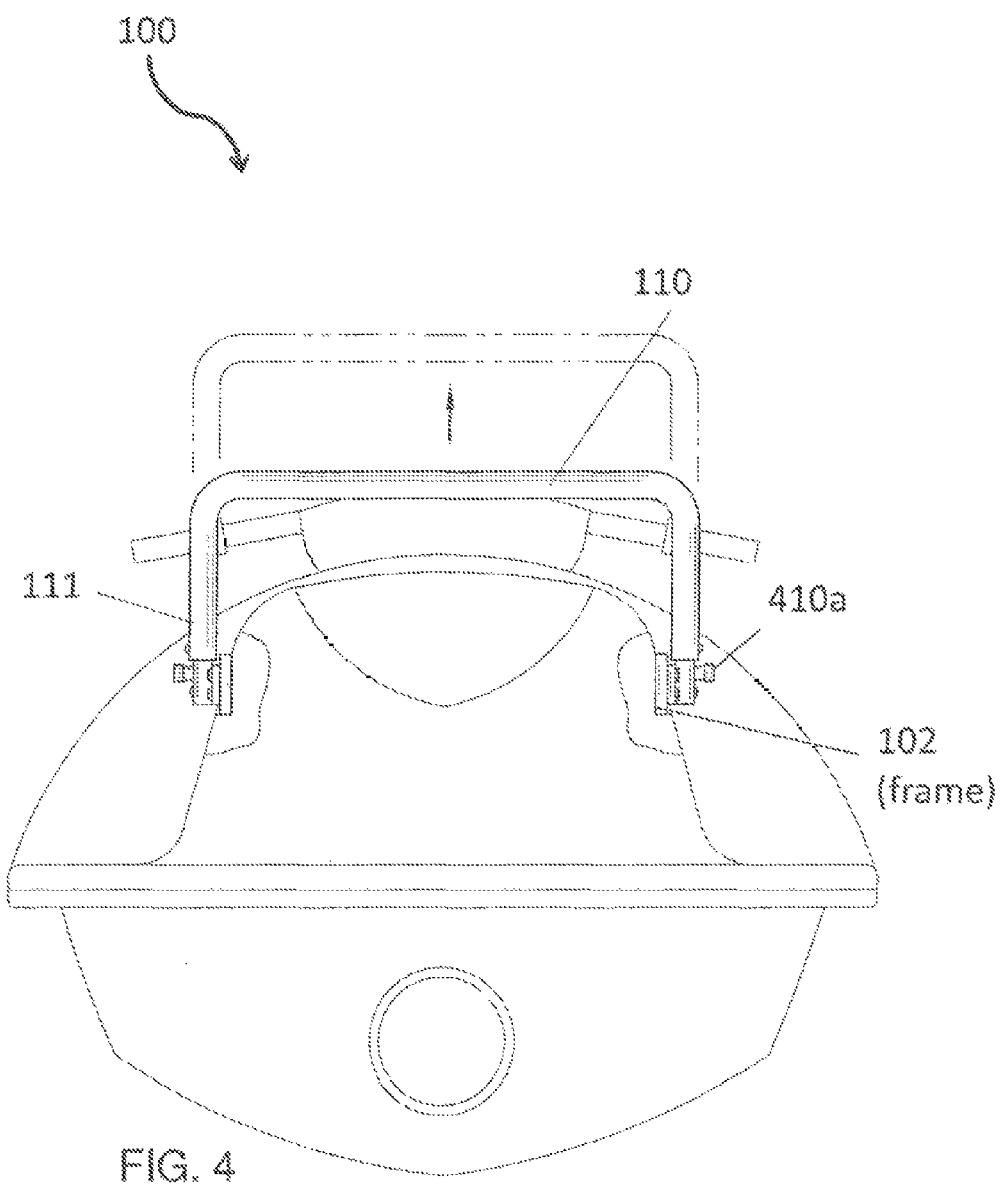
FIG. 4 is a back view of the safety bar device of FIG. 1 as attached to a water vehicle.

As shown in FIG. 4, the brackets (e.g., first mounting bracket 310, second mounting bracket 320) may be attached to the left side of the frame of the vehicle 102 and the right side 104 of the frame of the vehicle 102. The brackets may be attached to the vehicle 102 via an attachment means, for example a screw/bolt mechanism.

Figure 2:
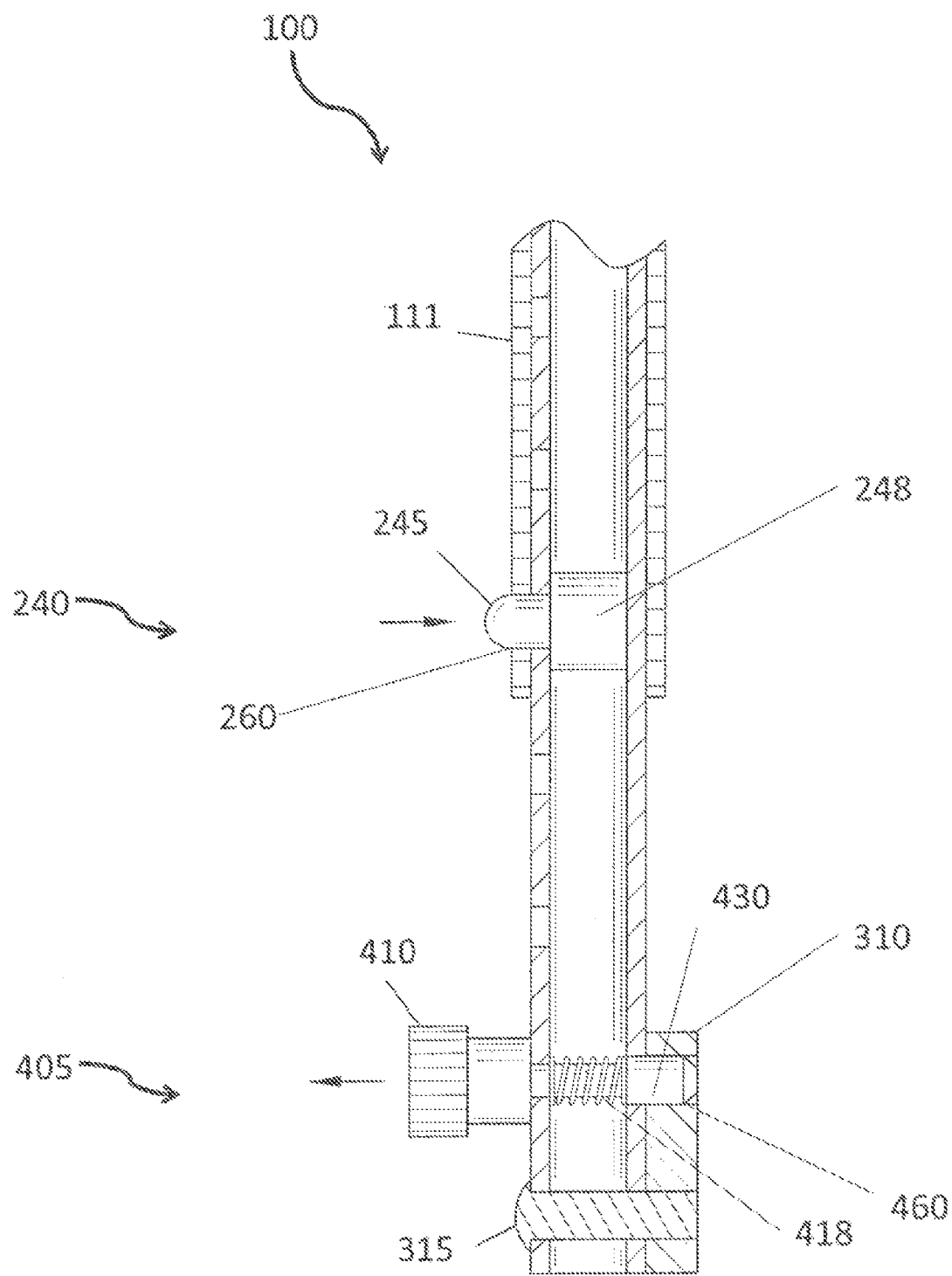
FIG. 2 is a side cross sectional view of the safety bar device of FIG. 1.

The safety bar device 100 is adjustable in height, for example the gripping component 110 can be moved upwardly and downwardly with respect to the first inner bar 210 and second inner bar 220. When a particular height of the gripping component 110 is chosen, the gripping component 110 can be locked in place via a first locking mechanism. As shown in FIG. 2, in some embodiments, the first locking mechanism may comprise a spring-loaded push button 240. Spring-loaded push buttons are well known to one of ordinary skill in the art. In some embodiments, a spring-loaded push button 240 may be disposed in the first inner bar 210 at or near the first end. In some embodiments, a spring-loaded push button 240 is disposed in the first side bar 111. The spring-loaded push button 240 comprises a button component 245 that is insertable into an aperture 260 disposed in the first side bar 111 of the gripping component 110 or an aperture 260a in the first inner bar 210. The button component 245 can move between an in position (where it is inside the first inner bar 210) and an out position (where it extends out of the first inner bar 210 and in some instances through an aperture 260, 260a). The button component 245 is biased in the out position caused by a first spring 248. To move the gripping component 110 upwardly and downwardly with respect to the first inner bar 210 and second inner bar 220, a user can push the button component 245 to the in position and slide the gripping component 110 upwardly or downwardly. When the user has chosen an appropriate position for the gripping component 110, he/she can release the button component 240 and allow it to return to the out position and extend through an aperture 260, 260a in the first side bar 111 of the gripping component and/or in the first inner bar 210. The first locking mechanism is not limited to a spring-loaded push button mechanism. In some embodiments, the gripping component 110 can be locked in place via a third locking mechanism (e.g., similar to the first locking mechanism) incorporated into the second side bar 112 and/or second inner bar 220.

In some embodiments, the gripping component 110 (e.g., horizontal bar 113) can be moved downwardly such that it is flush over the seat of the vehicle 102. This may be advantageous for when the device 100 of the present invention is not being used.

Figure 3:
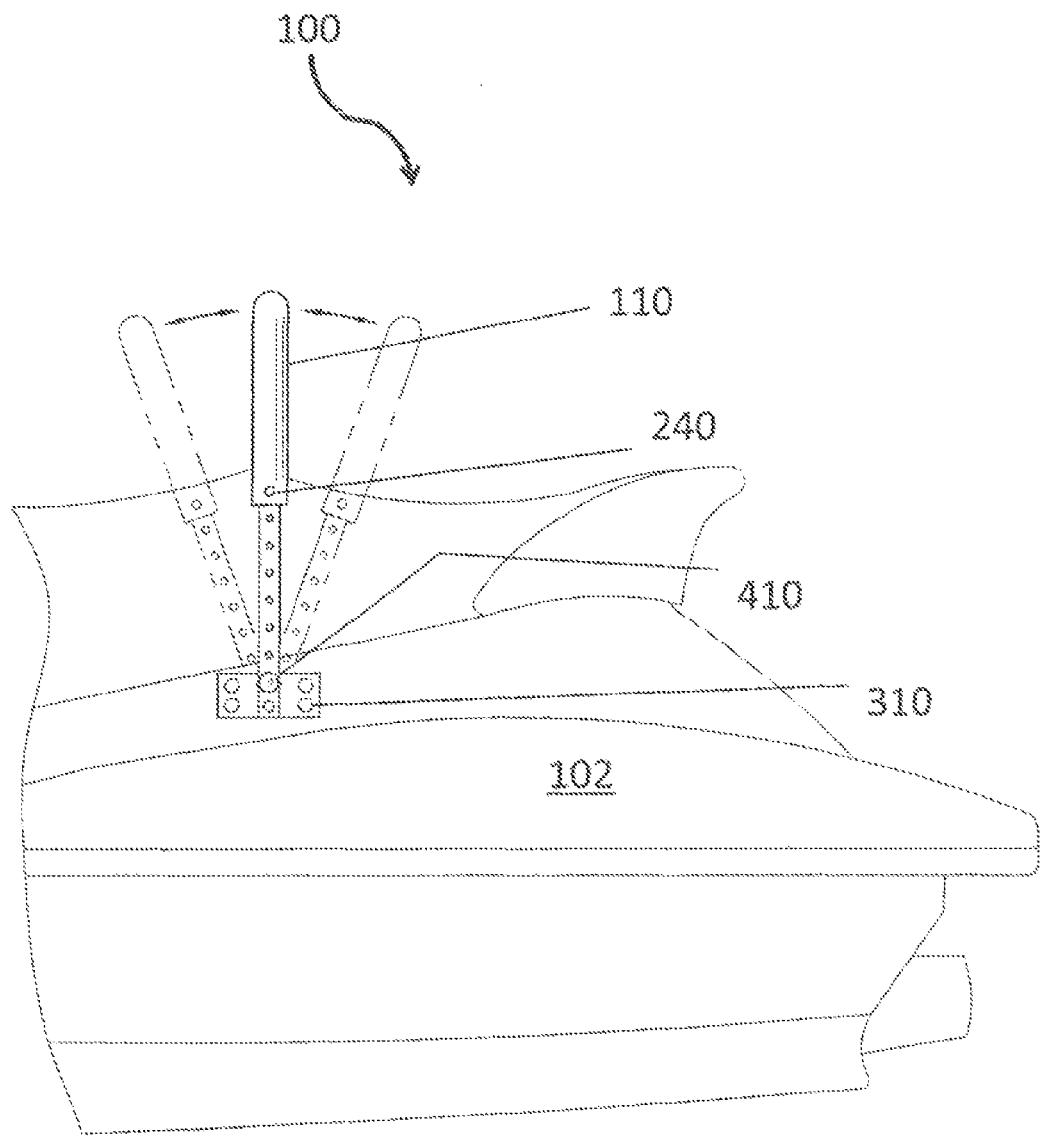
FIG. 3 is a side view of the safety bar device of FIG. 1 as attached to a water vehicle.

As shown in FIG. 3, in some embodiments, the second end 212 of the first inner bar 210 may be pivotally attached to the first mounting bracket 310 (e.g., via a first pivot component 315), and the second end 222 of the second inner bar 220 may be pivotally attached to the second mounting bracket 320 (e.g., via a second pivot component). This would allow the device 100 to also move forwardly and backwardly. This may allow a user to find a comfortable position for the gripping component 110. In some embodiments, the gripping component 110 can occupy various defined positions. For example, in some embodiments, the gripping component 110 can move between a first position and a second position, or between a first position and second position and third position, or between more than three positions.

When a particular forward or backward position of the gripping component 110 is chosen, by the user the gripping component 110 can be locked in place via a second locking mechanism. As shown in FIG. 3, in some embodiments, the second locking mechanism may comprise a spring-loaded pull knob mechanism 405. Pull knob mechanisms are well known to one of ordinary skill in the art.

In some embodiments, a spring-loaded pull knob 410 may be disposed in the first inner bar 210 at or near second end 212. The spring-loaded pull knob 410 comprises a pin component 430 that is insertable into an aperture 460 disposed in the first mounting bracket 310. The apertures 460 in the mounting brackets may correspond to the positions that the gripping component can occupy (e.g., first position, second position, third position, etc.). The pin component 430 can move between an in position (where it is inside the first inner bar 210) and an out position (where it extends out of the first inner bar 210 and in some instances through an aperture 460 in the mounting bracket 310). The pin component 430 is biased in the out position caused by a second spring 418. To move the pin component 430, a knob component 410 is disposed on the second end of the pin component 430. The knob component 410 extends outwardly from the first inner bar 210 and can be pulled outwardly, which pulls the pin component 430 to the in position. To move the gripping component 110 forwardly and backwardly, a user can pull the knob component 410, which moves the pin component 430 to the in position. The gripping component 110 can be moved backwardly and forwardly freely. When the user has chosen an appropriate position for the gripping component 110, he/she can release the knob component 410 and allow the pin component 430 to return to the out position and extend through an aperture 460 in the first mounting bracket 310. The second locking mechanism is not limited to a spring-loaded pull knob. In some embodiments, the second locking mechanism is incorporated into the second side bar 112 and the second inner bar 220. In some embodiments, a fourth locking mechanism (e.g., similar to the second locking mechanism) is incorporated into the second inner bar 220 and second mounting bracket, for example a second knob component 410a may extend from the second inner bar 220.

Figure 5:
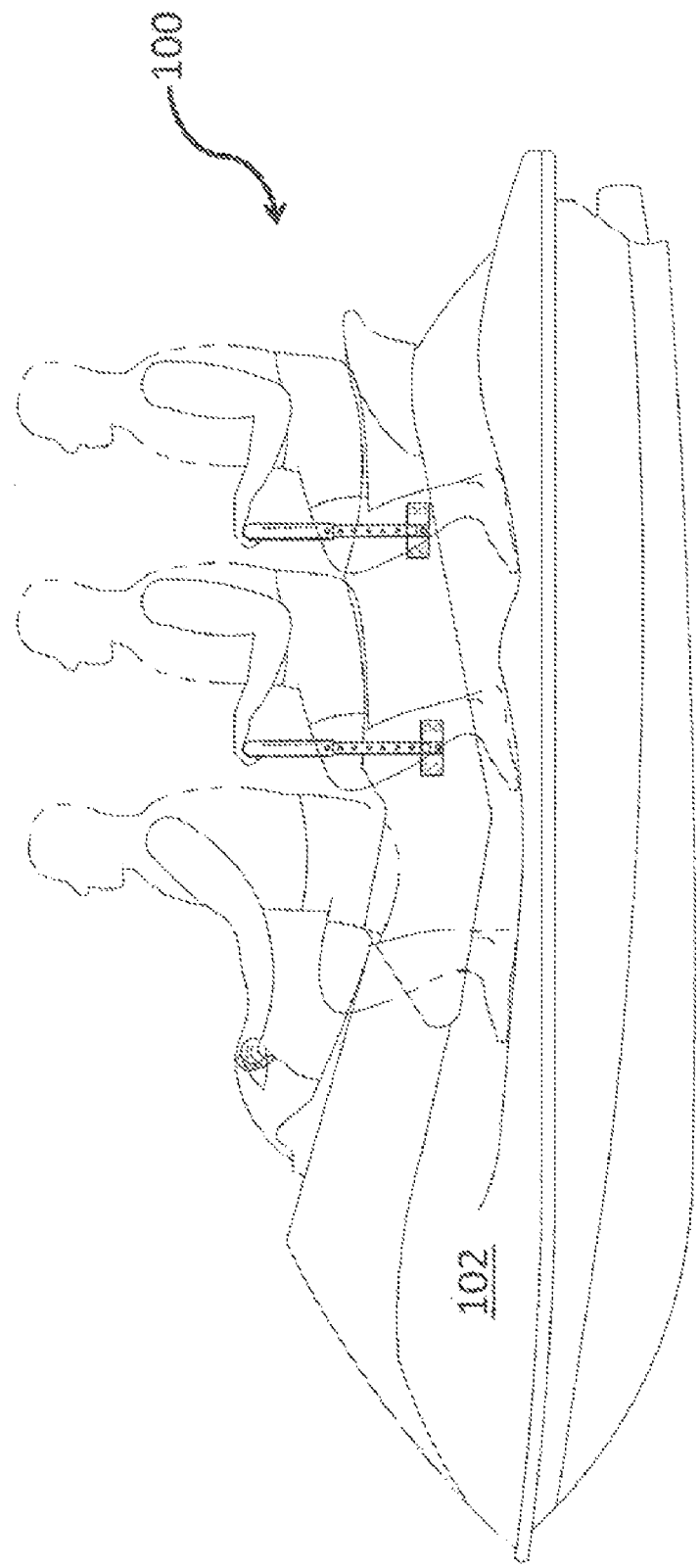
FIG. 5 is a first side view of the safety bar device of the present invention as used on a water vehicle.
Figure 6:
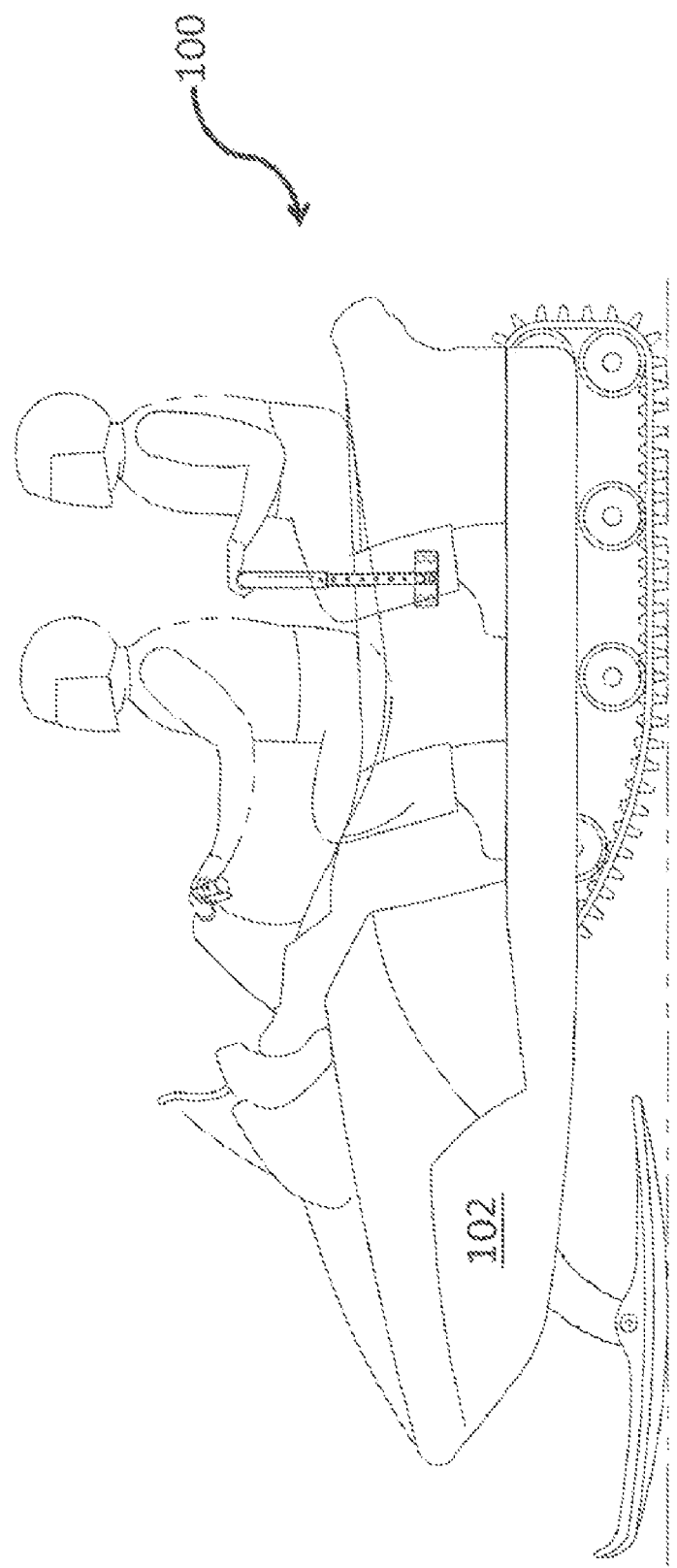
FIG. 6 is a second side view of the safety bar device of the present invention as used on a snow vehicle.

As shown in FIG. 5 and FIG. 6, in some embodiments, a rear passenger can pull the gripping component 110 to a height of his/her choice and slide his/her legs underneath the gripping component 110 while sitting on the rear of the vehicle 102 (e.g., water vehicle, snow vehicle). The device 100 of the present invention provides a solid comfortable alternative to gripping the driver (or a forward passenger). If a sudden acceleration or steering adjustment is made, the passenger may maintain a tight grip and may avoid toppling from the vehicle 102. The device 100 of the present invention provides for a means of securing a passenger's body (e.g., legs), which may provide additional comfort to the passenger.

The safety bar device 100 may be constructed in a variety of sizes. In some embodiments, the safety bar device 100 is between about 1 to 1.5 feet in height as measured from the second end 212 of the first inner bar 210 to the horizontal bar 113. In some embodiments, the safety bar device 100 is between about 1.5 to 2 feet in height as measured from the second end 212 of the first inner bar 210 to the horizontal bar 113. In some embodiments, the safety bar device 100 is between about 2 to 2.5 feet in height as measured from the second end 212 of the first inner bar 210 to the horizontal bar 113. In some embodiments, the safety bar device 100 is more than about 2.5 in height.

As used herein, the term "about" refers to plus or minus 10% of the referenced number. For example, an embodiment wherein the safety bar device 100 is about 2 feet in height includes a safety bar device 100 that is between 1.8 and 2.2 feet in height.

The following the disclosures of the following U.S. Patents are incorporated in their entirety by reference herein: U.S. Pat. No. 4,030,750; U.S. Pat. Application No. 2003/006082; U.S. Pat. No. 6,868,584; U.S. Pat. No. 6,896,279; U.S. Pat. No. 5,667,232; U.S. Pat. No. 5,002,149; U.S. Pat. No. 6,568,699; U.S. Pat. No. 6,966,471.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A retractable safety bar device for a rear passenger of a water vehicle, said safety bar device comprising:
   (a) a first mounting bracket adapted to be attached to a first side of the vehicle via an attachment means, and a second mounting bracket adapted to be attached to a second side of the vehicle via an attachment means;
   (b) a first inner bar pivotally attached to the first mounting bracket;
   (c) a second inner bar pivotally attached to the second mounting bracket;
   (d) a generally U-shaped gripping component comprising a first side bar, a second side bar opposite the first side bar, and a horizontal bar connecting the first side bar and second side bar, wherein the U-shaped gripping component comprises a full opening around an inner periphery, wherein the first side bar is attached to the second side bar only by the horizontal bar, wherein the first side bar is adapted for telescopically receiving the first inner bar and the second side bar is adapted for telescopically receiving the second inner bar, wherein the safety bar device is adjustable in height by moving the gripping component upwardly and downwardly with respect to the first inner bar and the second inner bar, wherein the safety bar device can pivot forwardly and backwardly between at least a first position, a second position, and a third position with respect to the first mounting bracket and second mounting bracket, wherein the device can accommodate the passenger's legs that are straddled on the inside of the bar;
   (e) a first locking mechanism for securing the gripping component at a certain height with respect to the first inner bar and second inner bar; and
   (f) a second locking mechanism for securing the safety bar device in one of the multiple positions.

2. The safety bar device of claim 1, wherein the first locking mechanism is a spring-loaded push button mechanism.

3. The safety bar device of claim 1, wherein a spring-loaded push button is disposed in the first inner bar at or near a first end.

4. The safety bar device of claim 1, wherein a spring-loaded push button is disposed in the first side bar of the gripping component.

5. The safety bar device of claim 1, wherein the second locking mechanism is a spring-loaded pull knob mechanism.

6. The safely bar device of claim 5, wherein the first mounting bracket comprises apertures adapted to accommodate the spring-loaded pull knob mechanism.

7. The safety bar device of claim 1, wherein the attachment means includes a screw/bolt mechanism.

\* \* \* \* \*